(12) United States Patent
Lazar

(10) Patent No.: US 9,146,730 B2
(45) Date of Patent: Sep. 29, 2015

(54) SYSTEM AND METHOD FOR REMOTELY UPDATING CABLE MODEM SOFTWARE

(71) Applicant: NETGEAR, Inc., San Jose, CA (US)

(72) Inventor: Patrick Lazar, San Jose, CA (US)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 14/197,313

(22) Filed: Mar. 5, 2014

(65) Prior Publication Data

US 2014/0282484 A1   Sep. 18, 2014

Related U.S. Application Data

(60) Provisional application No. 61/792,283, filed on Mar. 15, 2013.

(51) Int. Cl.
*G06F 9/44* (2006.01)
*G06F 9/445* (2006.01)

(52) U.S. Cl.
CPC ........................... *G06F 8/65* (2013.01)

(58) Field of Classification Search
CPC .......................................... G06F 8/65
USPC ........................................... 717/173
See application file for complete search history.

(56) References Cited

U.S. PATENT DOCUMENTS

| | | | |
|---|---|---|---|
| 7,069,334 B2* | 6/2006 | Wysoczynski | 709/232 |
| 2005/0034115 A1* | 2/2005 | Carter et al. | 717/173 |
| 2013/0003798 A1* | 1/2013 | Goldburg et al. | 375/222 |

OTHER PUBLICATIONS

University of South Florida, "Chaper 4—Cabling", Apr. 2010, https://web.archive.org/web/20100406052046/http://fcit.usf.edu/NETWORK/chap4/chap4.htm.*

* cited by examiner

*Primary Examiner* — Wei Zhen
*Assistant Examiner* — Lanny Ung
(74) *Attorney, Agent, or Firm* — Boyle Fredrickson, S.C.

(57) ABSTRACT

A telecommunication network device for implementing the DOCSIS standard during a transition from a coaxial cable network to a fiber-optic network is described. The device includes a memory including installed firmware for implementing a telecommunication gateway function in accordance with the DOCSIS telecommunication standard and a processor configured to update the installed firmware by downloading the update from a first TFTP server over a coaxial cable network, wherein the processor is further configured to update the installed firmware by downloading the update from a second TFTP server over a fiber-optic network.

14 Claims, 3 Drawing Sheets

SYSTEM AND METHOD FOR REMOTELY UPDATING CABLE MODEM SOFTWARE

CROSS-REFERENCE TO RELATED APPLICATIONS

This application claims the benefit of U.S. Provisional Application Ser. No. 61/792,283; filed Mar. 15, 2013, and entitled System and Method for Remotely Updating Cable Modem Software, the contents of which are hereby incorporated by reference in their entirety.

FIELD OF INVENTION

This invention generally relates to the field of cable modem software and, more particularly, to a system and method for upgrading firmware in a network device, such as a cable modem, during a transition from a coaxial cable based network to a fiber network.

BACKGROUND OF THE INVENTION

Cable modems allow users to access the Internet via their cable television service. Such access has typically been provided over a coaxial cable, typically implemented within a hybrid-fiber coaxial (HFC) infrastructure. An HFC network may carry a variety of services, including but not limited to analog TV, digital TV (SDTV or HDTV), video on demand, telephony, and high-speed data that demand transmission of a large amount of data at high speeds. Services on these systems are carried on radio frequency (RF) signals in the 5 MHz to 1000 MHz frequency band and currently can transfer data at 250 Mbps or higher.

Internet access in these systems is provided through the cable modem located in a location that typically comprises a home or business, in communication with a cable modem termination system (CMTS). The cable modem termination system provides cable services to a large number of cable subscribers, typically between 4,000 and 150,000 or more. A typical CMTS is a device which hosts downstream and upstream traffic. While downstream and upstream traffic travel on a shared coaxial cable line in the customer premises, and connect to a single connection on the cable modem, it is typical for the CMTS to have separate connectors for downstream and for upstream traffic. Traffic destined for the cable modem from the Internet, known as downstream traffic, is carried in IP packets encapsulated according to a Data Over Cable Service Interface Specification (DOCSIS) standard.

Cable modems typically include software implemented according to the DOCSIS standard, an international telecommunications standard that permits the addition of high-speed data transfer to an existing cable TV (CATV) system. DOCSIS is constantly being revised and upgraded based on changing needs. For example, DOCSIS was once revised because of increased demand for symmetrical services such as IF telephony in order to provide enhanced upstream transmission speeds, and was more recently revised to significantly increase transmission speeds (this time both upstream and downstream) and to introduce support for Internet Protocol version 6 (IPv6). However, these revisions and other changes to the firmware installed in cable modems require instantiation of a system to manage software upgrades.

DOCSIS management software automates the discovery and inventory management of DOCSIS devices by maintaining a centralized inventory of DOCSIS devices and automatically detecting newly provisioned devices, validating firmware versions and upgrading, if needed. DOCSIS management software is implemented by software installed on the CMTS and typically does not require any other service or software download installed on the cable modem in the borne or business. Accordingly, cable modems for use with coaxial cable networks that are installed in user's location typically do not include a large memory and/or a powerful processor for implementing software management since software management functions typically are performed by the DOCSIS management software at the CMTS.

In contrast, fiber networks also are used to provide bundled Internet access, telephone services, and television services over a fiber-optic communications network. Low-loss fiber optic cables carry a signal for several miles before needing a repeater while signal losses are high in coaxial cable. Additionally, fiber optic cables carry far more information than coaxial cables. A fiber optic system can carry up to 10 gigabits per second while coaxial cable is limited to only 250 megabits per second. Accordingly, some systems are transitioning to fiber optic networks to manage the increased data demands of a typical household.

In a typical installation, a single-mode optical fiber extends from an optical line terminal at a fiber optic services (FIOS) central office out to neighborhoods, where a passive optical splitter fans out the same signal on up to 32 fibers, thus serving up to 32 sites or "subscribers." At a subscriber's location, an optical network terminal (ONT) transfers data onto the corresponding in-home copper wiring for phone, video, and Internet access. Typical FIOS installations mount the ONT inside the location and use a category five cable for data and coaxial cable for video. Voice service is carried over the existing telephone wires already in the building.

Although fiber optic network can use existing wiring hardware for providing data services, a problem occurs in managing software for the existing cable modem that had been implementing the DOCSIS standard. Fiber optic networks are setup to use a server that provides updates to the cable modem using a fiber optic update management client installed on the cable modem. However, as stated earlier, DOCSIS based cable modems typically do not have a large memory and a powerful processor to store and implement such an update management client.

What is needed, therefore, is a system and method for updating software in a network device implementing the DOCSIS standard following a transition from a coaxial cable network to a fiber-optic network.

What is further needed is such a system and method configured to facilitate ongoing remote updating of firmware in a telecommunication network device following a transition from a coaxial cable network to a fiber-optic network.

SUMMARY

According to one embodiment of the invention, one or more of the above-identified needs are met by providing a telecommunication network device for implementing the DOCSIS standard during a transition from a coaxial cable network to a fiber-optic network. The device includes a memory including installed firmware for implementing a telecommunication gateway function in accordance with the DOCSIS telecommunication standard and a processor configured to update the installed firmware by downloading the update from a first TFTP server over a coaxial cable network. The processor is further configured to update the installed firmware by downloading the update from a second TFTP server over a fiber-optic network.

In one embodiment, the processor is configured to update the installed firmware by downloading the update from the second TFTP server based on a transition from the coaxial cable network to the fiber-optic network. The processor may be configured to detect the transition from the coaxial cable network to the fiber-optic network based upon received telecommunication data.

In yet another embodiment, the processor is configured to update the installed firmware by downloading the update from the second TFTP server based on a command received from a TR-069 server. The received command may include a file address of the firmware update on the second TFTP server. Further, the processor may be configured to transmit an acknowledgement to the TR-069 server following the update of the installed firmware from the second TFTP server.

According to another aspect of the invention, a computer implemented method for implementing the DOCSIS standard during a transition from a coaxial cable network to a fiber-optic network is disclosed. The method includes transmitting and receiving telecommunication data in accordance with the DOCSIS telecommunication standard under the control of software installed in a memory of a network device, updating the installed firmware by downloading an update from a first TFTP server over a coaxial cable network, and updating the installed firmware by downloading the update from a second TFTP server over a fiber-optic network.

According to another aspect of the invention, a telecommunication network device for implementing the DOCSIS standard during a transition from a coaxial cable network to a fiber-optic network is described. The device includes a memory including installed firmware for implementing a telecommunication gateway function in accordance with the DOCSIS telecommunication standard and additionally includes a processor configured to update the installed firmware by downloading the update from a TR-069 server over a fiber-optic network.

Other features and advantages of the invention will become apparent to those skilled in the art upon review of the following detailed description and drawings in which like numerals are used to designate like features.

Figure 1:
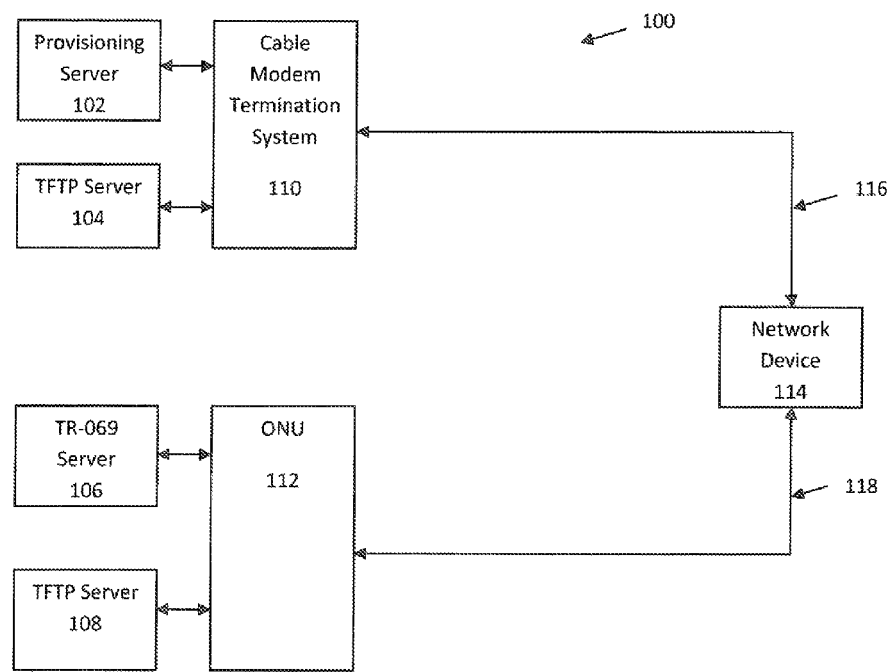
FIG. 1 schematically illustrates a networking environment for providing telecommunication services to a location, according to an exemplary embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Referring now to FIG. 1, a networking environment 100 for providing telecommunication services to a location through a network device 114 is shown, according to an exemplary embodiment. The location will most typically comprise a home or a business located in a standalone or multi-unit facility. The terms "home", "business", and "location" are all used synonymously herein.

The telecommunication services and updates to the firmware implementing the telecommunication services may be provided to the location even during a transition from a coaxial cable network to a fiber-optic network. Although environment 100 is shown as including specific components in communication with each other according to a specific configuration, it should be understood that the environment 100 may include different components and/or a different configuration of components to implement the functionality described herein.

Network device 114 may be any device configured to manage the flow of data to, from, and/or between telecommunication devices on a home network using communication with an external network. According to an exemplary embodiment, network device 114 may be a cable modem. Functionality described herein as being associated with network device 114 may be implemented using one or more devices. For example, network device 114 may be configured to include a router in communication with a network switch, either of which can be configured to perform some or all of the functions described herein. Network device 114 may further be implemented using a plurality of network devices in communication with each other, such as a wireless access point in communication with a gateway router. One exemplary embodiment of network device 114 is the DOCSIS 3.0/EURODOCSIS 3.0 Wireless-N-Voice/Data Cable Gateway manufactured by Netgear, Inc. of San Jose, Calif.

Telecommunication network device 114 is configured to forward information, such as data packets, between the computers within the home or business environment and/or with one or more of systems 102-112. Network device 114 is further configured to forward voice and/or television data to devices within the home or business. Network device 114 is configured to perform the telecommunication distribution functions in accordance with the DOCSIS standard. Accordingly, network device 114 may be configured to provide voice, television and Internet access services based on communication with cable modem termination system 110 in an initial configuration.

Figure 2:
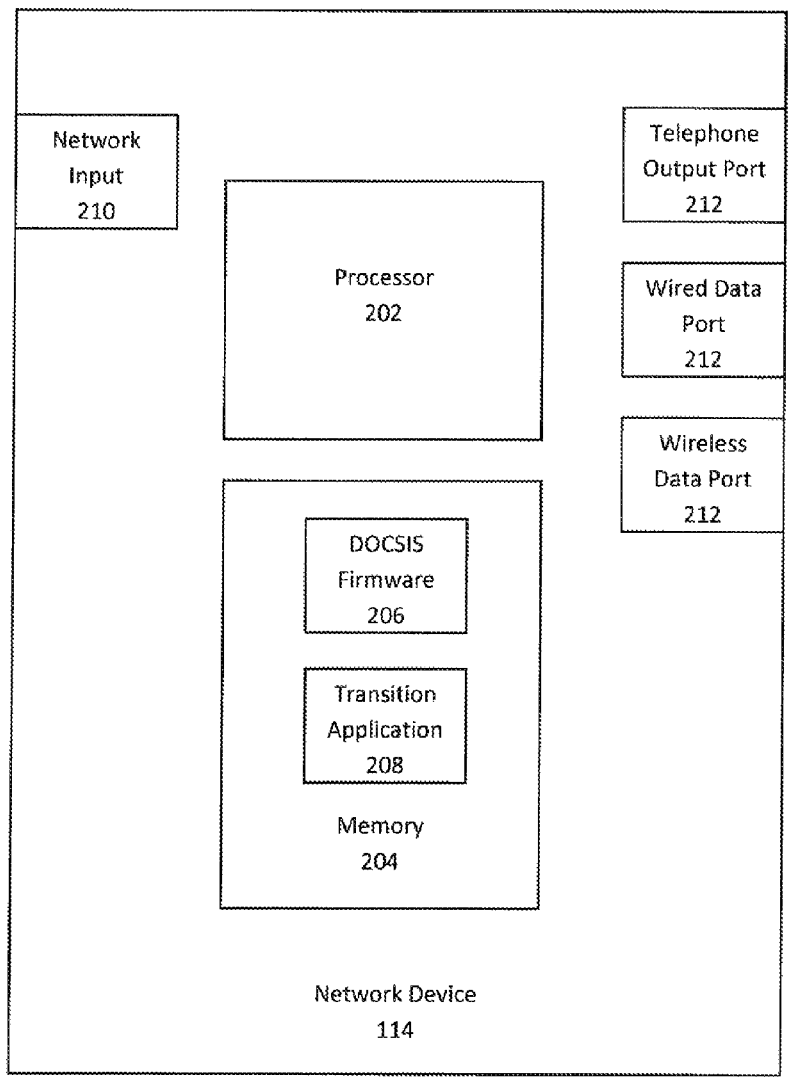
FIG. 2 schematically illustrates a network device implementing the DOCSIS standard configured for updating software in the network device following a transition from a coaxial cable network to a fiber-optic network, according to an exemplary embodiment.

Referring now to FIG. 2, an embodiment of network device 114 is shown in greater detail, according to an exemplary embodiment. Although device 114 is shown in FIG. 2 as including specific components in exemplary configurations, it is important to recognize that device 114 may include more, fewer, and/or a different configuration of components to implement the functions described herein.

Components of the network device 114 include a coaxial cable input port 210 receiving information from an external network, such as from a cable modem termination system, a telephone output port 212 configured to provide telephony data to an in-home telephone network, a wired network data port 214 configured to provide network data services through a coupled Ethernet cable, and a wireless network data port 212 configure to provide network data service through an antenna using, for example, a WiFi communication protocol. Device 114 may include additional, fewer, and/or a different configuration of components to implement the telecommunication functions described herein.

The functional components of network device 114 may be implemented using hardware including a processor 202, a system memory 204, and a system bus (not shown) that couples various system components, including the system memory 204, to the processor 202. The system bus may be any of several types of bus structures including a memory bus or a memory controller, a peripheral bus, and a local bus using any of a variety of bus architectures. Further, the described components may be implemented using hardware and/or software.

The processor 202 of device 114 may be any type of computer processor configured to implement the functionality described herein including the steps of sending and receiving telecommunication data to and from an external network and one or more telecommunication devices in the home. The processing unit may be a MIPS, ARM, x86, or other processor as are known in the art or later developed.

The system memory 204 of device 114 includes computer storage media in the form of volatile and/or nonvolatile memory such as read only memory (ROM) and random access memory (RAM). A basic input/output system (BIOS), containing the basic routines that help to transfer information between elements within device 114, such as during start-up or networking operations, is typically stored in ROM. RAM typically contains data and/or program modules that are immediately accessible to and/or presently being operated on by the processing unit. The device 114 may also include other removable/non-removable, volatile/nonvolatile computer storage media, such as flash memory.

Although network device 120 may be any of a variety of types of network devices, for clarity device 114 is further described herein with reference to a router-type network device configured to facilitate communication of telecommunication data according to the DOCSIS communication standard. Accordingly, memory 204 is configured to include DOCSIS firmware 206 including applications and data implemented in accordance with the DOCSIS standard. Exemplary applications may include firmware to control the operation of the device 120, network security applications, such as a firewall implementation, network address translation, a network filtering application, etc.

Memory 204 further includes a network transition application 208 configured to facilitate updating software in network device 114 following a transition from a coaxial cable network to a fiber-optic network. The software may include computer instructions executable by the processor 202 to reconfigure the operation of DOCSIS firmware 206 following the transition. Network transition application 208 may be configured to receive an input from an operator indicative of the transition and/or may be configured to automatically detect the transition based on the data received as an input to device 114.

Referring again to FIG. 1, cable modem termination system (CMTS) 110 is configured to be a component in a hybrid fiber-coaxial (HFC) infrastructure. CMTS 110 sends and receives data to and from the network device 114 and routes it to an Internet service provider (ISP) for connection to the Internet. CMTS 110 may be implemented using a router specifically configured to communicate with a HFC cable network via a cable modem card. CMTS 110 is further configured to provide software upgrade services in conjunction with a provisioning server 102 and a trivial file transfer protocol (TFTP) server 104. TFTP is a simple file transfer protocol used for downloading boot code to diskless systems. Device 114 is configured to communicate with CMTS 110, provisioning server 102 and TFTP server 104 through a coaxial cable network 116. Although shown as separate components in this exemplary embodiment, one or both of provisioning server 102 and TFTP server 104 may be implemented as components of the CMTS 110. Although shown as different servers, TFTP server 104 and TFTP server 108 may the same software allowing use of the same software to perform the software download.

Optical Network Unit (ONU) 112 is configured to be a component of a fiber-optic communication network. ONU 112 sends and receives data to and from the network device 114 and routes it to an Internet service provider (ISP) for connection to the Internet, similar to CMTS 110. CMTS 110 is also further configured to provide software upgrade services in conjunction with a TR-069 server 106 and a trivial file transfer protocol (TFTP) server 108. TR-069 (Technical Report 069) is a technical specification that defines an application layer protocol for remote management of end-user devices and is described in further detail in the attached Appendix. The specification dictates the communication between customer-premises equipment (CPE), such as network device 114, and Auto Configuration Servers (ACS), such as TR-069 server 106. The TR-069 standard was developed for automatic configuration of these devices with Auto Configuration Servers (ACS). It is important to recognize that updating the firmware based on a command received from the TR-069 server 106, as described herein, is contrary to the normal operation of the TR-069 server.

During normal TR-069 operation, all communications and operations are performed in the scope of a provisioning session. The session is always started by the device and begins with the transmission of an Inform message. Its reception and readiness of the server for the session is indicated by an InformResponse message. The order of the next two stages depends on the value of a holdRequests flag in the InformResponse message. If the value is false, the initialization stage is followed by the transmission of device requests, otherwise ACS orders are transmitted first.

In the second stage, orders are transmitted from the device to the ACS. Even though the protocol defines multiple methods that may be invoked by the device on the ACS, only one is commonly found—TransferComplete. This stage is finalized by transmission of the empty HTTP-request to the ACS.

In the third stage, the roles change on the CPE WAN Management Protocol (CWMP) level. The HTTP-response for the query by the device will contain a CWMP-request from the ACS. This will subsequently be followed by an HTTP-request containing a CWMP-response for the previous CWMP-request. Multiple orders may be transmitted one-by-one. This stage (and the whole provisioning session) is terminated by an empty HTTP-response indicating that no more orders are pending.

Referring again to FIG. 1, network device 114 is configured to communicate with ONU 112, TR-069 server 106 and TFTP server 108 through a fiber-optic network 118 to modify the above described protocol. Although shown as separate components in this exemplary embodiment, one or both of TR-069 server 106 and TFTP server 108 may be implemented as components of the ONU 112.

Figure 3:
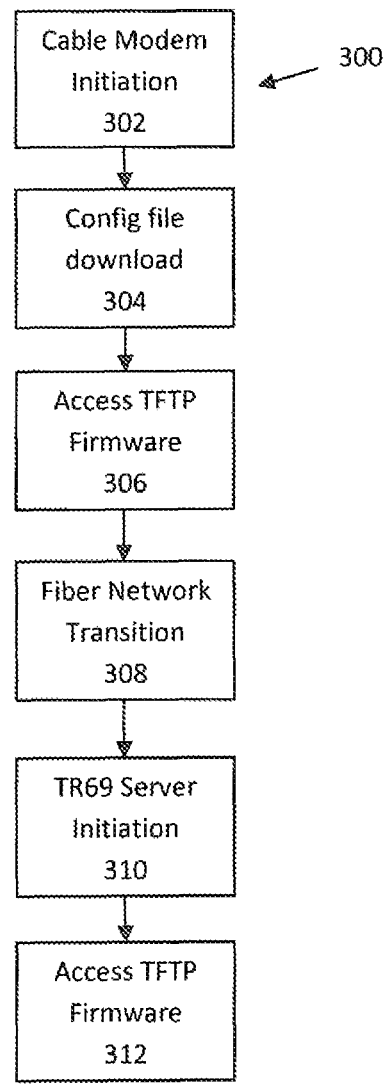
FIG. 3 is a flowchart illustrating a method for updating software in a network device implementing the DOCSIS standard following a transition from a coaxial cable network to a fiber-optic network, according to an exemplary embodiment.

Referring now to FIG. 3, a flowchart 300 illustrating an exemplary method for updating software in a network device implementing the DOCSIS standard following a transition from a coaxial cable network to a fiber-optic network is shown. The method of flowchart 300 may be implemented using network device 114 and/or other devices in environment 100 and may also include MOM, fewer, and/or a different configuration of steps to achieve the functionality described herein.

In a first step 302, operation of network device 114 is initiated. Network device 114 may be initiated during an initial power up, after waking from sleep state, after a period of inactivity, based on an elapsed time etc. Following initiation, a configuration file is downloaded by network device 114 in a step 304. The configuration file may be instantiated during an initial use of the network device 114 and only downloaded thereafter based on a change in the information included in the configuration file. Using the information the configuration file, network device 114 is provided with the address of the TFTP server 104 configured to provide the firmware controlling the operation of the processor 202.

In a step 306, network device 114 first authenticates itself with the provisioning server 102, shown in FIG. 1. Authentication includes self identifying hardware, installed software, system protocols, requiring that the MAC address to be confirmed to be in the MSO database and the certificate on board to be valid, etc. to fully inform the provisioning server 102. Thereafter, device 114 accesses the FTP server 104 to download new firmware based upon instructions received from provisioning server 202. Accordingly, using the steps 302-306, device 114 is configured to automatically update software installed on network device 114 in accordance with the DOCSIS standard over the coaxial cable network 116 based on instructions received from the provisioning server 102.

At some point, during utilization of the network device 114, it may become necessary to transfer network device 114 from the coaxial cable network 116 to the fiber-optic network 118. Advantageously, device 114 is configured to be able to operate and implement updates to the firmware stored in memory 204 independent of the transition from the coaxial cable network 116 to the fiber-optic network 118. According to an exemplary embodiment, network device 114 may be configured to include a translator configured to receive TR-069 based messages and convert them to the DOCSIS based Management Information Base (MIB) commands. Accordingly, in a step 308, a field technician removes the coaxial cable input line and connects network device 114 network input port 210 to a fiber-optic based modem. Device 114 may be configured to automatically detect the change based on the data received at the input port 210 or may receive an input from the technician indicating the change.

According to this exemplary embodiment, device 114 continues operating normally independent of the transition from the coaxial cable network 116 to fiber optic network 118. Both systems, TR-069 and Docsis have PUSH or PULL mechanisms to drive firmware updates. The authentications differ in that Docsis has a tighter and more secure method (overkill method) and TR-069 can be setup to be flexible or very secure. Normal operation includes provision of telecommunication data independent of the transition from the coaxial cable network 116 to the fiber-optic network 118. In other words, device 114 is configured to operate substantially the same independent of the transition during normal operation.

However, at some point in time, an update to the DOCSIS firmware 206 stored in memory 204 of the network device 114 will be implemented to implement a bug fix, to implement a new feature, to upgrade software functionality, etc. However, as described above, fiber optic networks and their associated servers are not configured to implement software updates using a provisioning server 102, as is typically done with a coaxial cable network 116.

Accordingly, following the transition, in a step 310, the TR-069 server 106 initiates to force a download to network device 114 and provides the address of the new TFTP server 108 to the network device 114. Essentially, the TR-069 server 106 commands the network device 114 to accept a download from the TFTP server 108 similar to the step implemented by the provisioning server 102. However, this type of operation is atypical for a TR-069 server 106. Network device 114 is configured to store the received address within memory 204, the received address including a file location on the TFTP server 108.

In a step 312, network device 114 accesses TFTP server 108 to download new firmware based on the received command from the TR-069 server 106 because the network device 114 does not include enough memory to install and implement a TR-069 client. Accordingly, the TR-069 protocol is modified to include providing instructions in the TR-069 messaging to instruction the network device 114 to access the TFTP server 110 to implement the firmware update. In conjunction with the download of the new firmware, new device 114 is configured to transmit the acknowledgment to the TR-069 server when the download completes.

Certain terminology is used herein for purposes of reference only, and thus is not intended to be limiting. For example, terms such as "network device" refer to any system receiving and retransmitting information packets in a computer network. Examples can include a network router, a network switch, a wireless access point, a gateway router, etc.

References to "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processors and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A telecommunication network device for implementing the Data Over Cable Service Interface Specification (DOCSIS) standard during a transition from a coaxial cable network to a fiber-optic network, the network comprising:
   a memory including installed firmware for implementing a telecommunication gateway function in accordance with the DOCSIS telecommunication standard; and
   a processor configured to first update the installed firmware by downloading the update from a first, trivial file transfer protocol (TFTP) server over a coaxial cable network, wherein the update download is managed by a provisioning server through a cable modem termination system connecting the network device to the coaxial cable network, wherein the processor is further configured to second update the installed firmware by downloading the update from a second TFTP server over a fiber-optic network, wherein the update download is managed by a remote server through an optical network unit connecting the network device to the fiber optic network, wherein the processor is configured to update the installed firmware by downloading the update from the second TFTP server based on a transition from the coaxial cable network to the fiber-optic network.

2. The network device of claim 1, wherein the processor is configured to detect the transition from the coaxial cable network to the fiber-optic network based upon received telecommunication data.

3. The network device of claim 1, wherein the processor is configured to update the installed firmware by downloading the update from the second TFTP server based on a command received from the remote server, wherein the remote server a TR-069 server.

4. The network device of claim 3, wherein the received command includes a file address of the firmware update on the second TFTP server.

5. The network device of claim 4, wherein the processor is configured to transmit an acknowledgement to the TR-069 server following the update of the installed firmware from the second TFTP server.

6. A computer implemented method for implementing the Data Over Cable Service Interface Specification (DOCSIS) standard during a transition from a coaxial cable network to a fiber-optic network, the method comprising: transmitting and receiving telecommunication data in accordance with the DOCSIS telecommunication standard in accordance with software installed in memory of a network device;

updating the installed firmware by first downloading an update from a first trivial file transfer protocol (TFTP) server over a coaxial cable network, wherein the update download is managed by a provisioning server through a cable modem termination system connecting the network device to the coaxial cable network; and updating the installed firmware by second downloading the update from a second TFTP server over a fiber-optic network, wherein the update download is managed by a remote server through an optical network unit connecting the network device to the fiber optic network, wherein the processor is configured to update the installed firmware by downloading the update from the second TFTP server based on a transition from the coaxial cable network to the fiber-optic network.

7. The method of claim 6, wherein the processor is configured to detect the transition from the coaxial cable network to the fiber-optic network based upon received telecommunication data.

8. The method of claim 6, wherein the processor is configured to update the installed firmware by downloading the update from the second TFTP server based on a command received from the remote server, wherein the remote server is a TR-069 server.

9. The method of claim 8, wherein the received command includes a file address of the firmware update on the second TFTP server.

10. The method of claim 8, wherein the processor is configured to transmit an acknowledgement to the TR-069 server following the update of the installed firmware from the second TFTP server.

11. A telecommunication network device for implementing the Data Over Cable Service Interface Specification (DOCSIS) standard during a transition from a coaxial cable network to a fiber-optic network, the network device comprising:

a memory including installed firmware for implementing a telecommunication gateway function in accordance with the DOCSIS telecommunication standard; and a processor configured to update the installed firmware by downloading the update from a TR-069 server over a fiber-optic network based on a transition from the coaxial cable network to the fiber-optic network, wherein the update download is managed by the TR-069 server through an optical network unit connecting the network device to the fiber optic network.

12. The device of claim 11, wherein the processor is configured to update the installed firmware by downloading the update from the TR-069 server based on a command received from an operator.

13. The device of claim 11, wherein the received command includes a file address of the firmware update on the TR-069 server.

14. The device of claim 11, wherein the processor is configured to transmit an acknowledgement to the TR-069 server following the update of the installed firmware from the TR-069 server.

* * * * *